Oct. 10, 1933. A. CROSS ET AL 1,930,419
RING FOR PISTONS OF ENGINES, PUMPS, AND THE LIKE
Filed Aug. 31, 1932 2 Sheets-Sheet 1
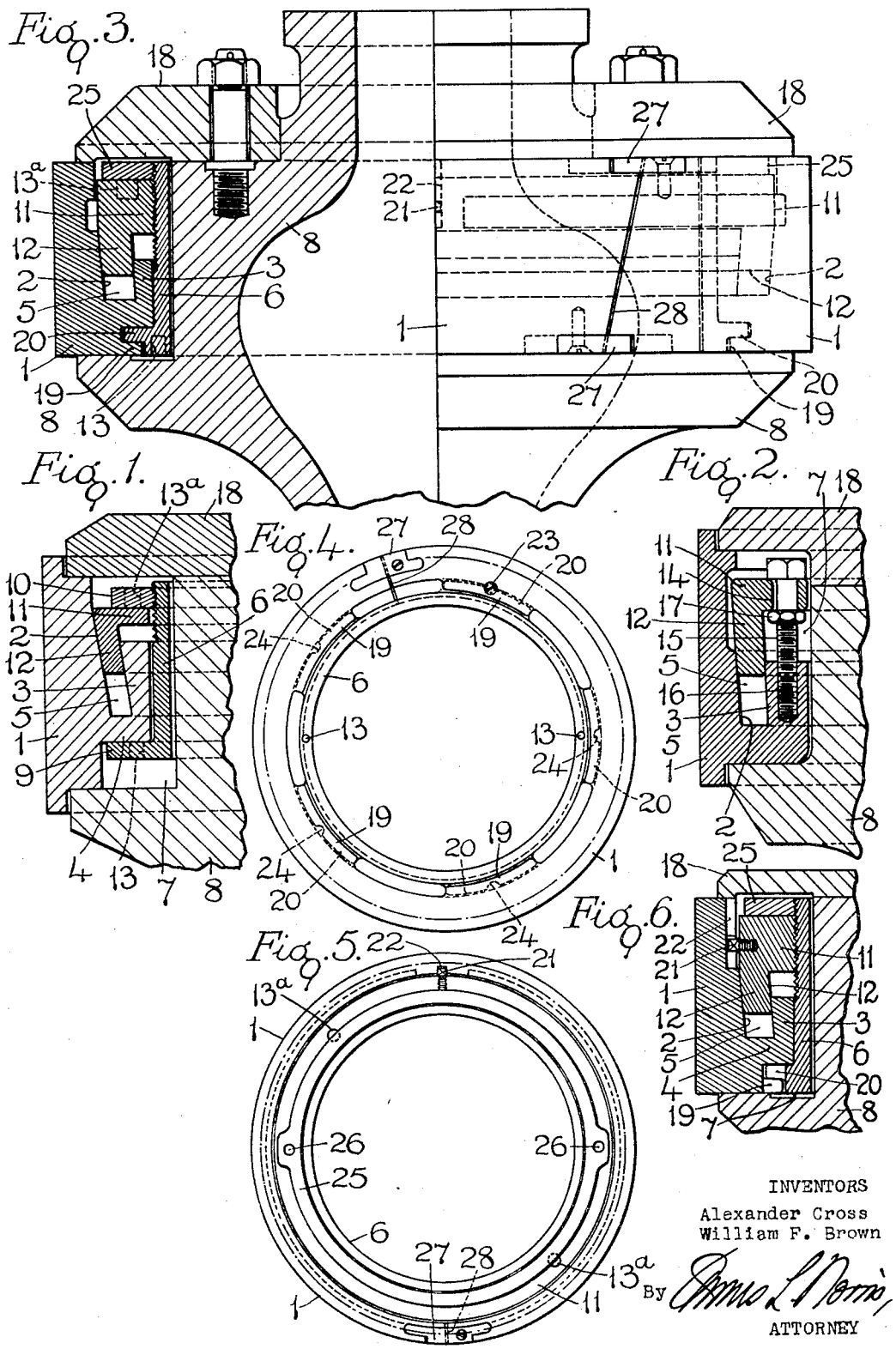
INVENTORS
Alexander Cross
William F. Brown
By *James L. Norris,*
ATTORNEY Oct. 10, 1933.  A. CROSS ET AL  1,930,419
RING FOR PISTONS OF ENGINES, PUMPS, AND THE LIKE
Filed Aug. 31, 1932  2 Sheets-Sheet 2
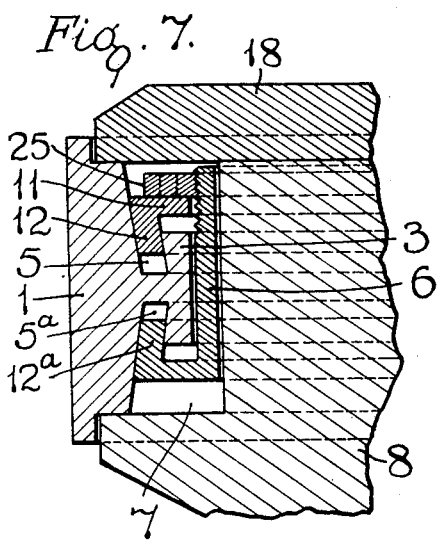
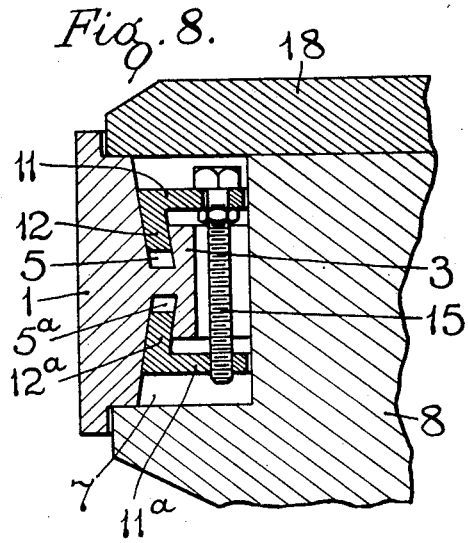
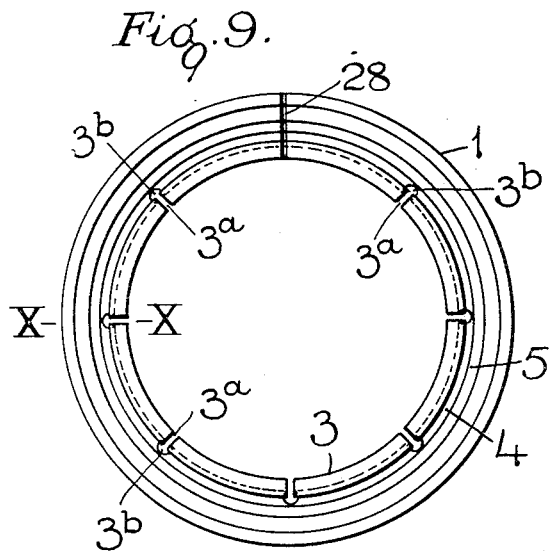
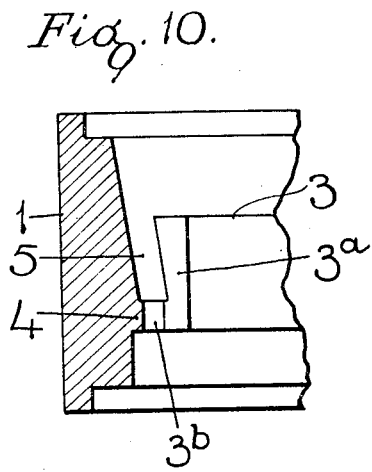
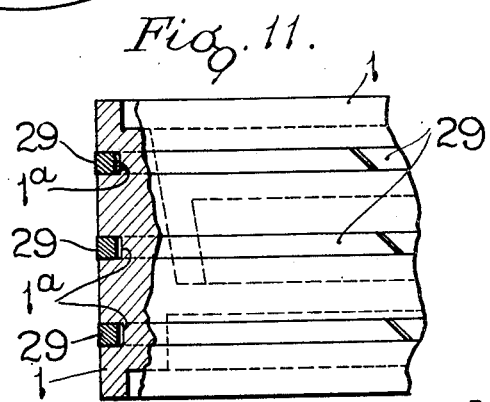
INVENTORS
Alexander Cross
William F. Brown
ATTORNEY Patented Oct. 10, 1933

1,930,419

UNITED STATES PATENT OFFICE 1,930,419

RING FOR PISTONS OF ENGINES, PUMPS, AND THE LIKE

Alexander Cross and William Fearon Brown, London, England, assignors, by direct and mesne assignments, to The Clan Engineering Patents Limited, London, England, a registered company of Great Britain Application August 31, 1932, Serial No. 631,284, and in Great Britain December 29, 1931

8 Claims. (Cl. 309—36)

This invention relates to expansible rings for pistons of steam and other engines, pumps and the like of the class in which a split ring having one or more conical surfaces on its inside is expanded by means of a non-expansible conical inner member or members engaging with the conical surface or surfaces of the split ring.

The object of the present invention is to provide an improved expansible ring which will not expand or collapse when in a set condition, and which forms at the same time, with the expanding means, a self-contained unit in which the whole of the outside periphery is afforded by the split ring, and to provide a construction in which the split ring is expanded or collapsed radially and will at the same time remain in a true circle.

According to this invention, the split ring is formed or provided with one or more conical surfaces on its inside face, and a non-expansible conical inner member or members is or are provided for engaging on such conical surface or surfaces for expanding the split ring radially, the inside of the split ring and the expanding means being so constructed that they interconnect with one another within the split ring whereby the split ring is positively engaged on its inside with the expanding means and is prevented from expanding or collapsing from the set position in truly circular form.

Our invention will be clearly understood from the following description aided by the accompanying drawings in which examples of carrying the invention into effect are illustrated and in which:

Figure 1 is a sectional view of part of a piston head showing one ring constructed according to this invention applied.

Figure 2 is a part section of a portion of a piston head having a modified construction of ring.

Figure 3 is a part sectional view of one end of a high pressure piston valve showing a further modified construction of ring.

Figure 4 is an under plan viewed from the center of the valve.

Figure 5 is a plan of the ring.

Figure 6 is a detail sectional view.

Figure 7 is a part sectional view of a portion of a piston head showing a still further modified construction of ring.

Figure 8 is a view similar to Figure 7 showing another example of ring construction.

Figure 9 is a plan view of another modified construction of ring.

Figure 10 is a section on the line X—X of Figure 9, and

Figure 11 is a part sectional view of a portion of a ring showing a modified construction fitted with a particular type of rings.

The invention can be carried into effect in a variety of ways, and as one example we will describe one construction in connection with Figure 1 of the drawings, in which we employ a ring 1 split at an angle and having a conical inner wall or surface 2 projecting inwards from one edge towards a point at a little distance from the other edge. On the inside of the ring 1, there is another ring or flange 3 of less depth than the packing ring 1 having its outside face of conical shape and in parallelism to surface 2. Said inner ring 3 is either formed as part of the outer ring 1 or secured thereto by a spacing or distancing flange 4. Thus a slot or recess 5 at an angle at the back of the outer ring 1 is produced.

In conjunction with such ring 1, we employ another ring 6 positioned within the inner ring 3, and in a groove 7 of a piston or plunger 8, having a cover 18. Ring 6 is provided with a flange 9 at its lower edge overlapping flange 4. The periphery of this ring is screw-threaded at the non-flanged end and on same is screwed an internally threaded collar or disc 10.

On the inner ring 6 is also positioned a disc or collar 11 having an external angled flange or rim 12 to correspond to the angled slot 5 in the split ring 1.

In use, the flanged ring 6 is positioned in the split ring 1 with its flange 9 engaging under flange 4. The flanged disc or collar 11 is then placed over same with its flange or rim 12 disposed in the angle slot 5 and the screw-threaded collar 10 then screwed on. By screwing collar 10 down, the flange 12 is forced into the slot 5 or recess and through the coaction of their conical surfaces the split ring 1 is expanded, and by reason of the slot 5 or recess engaging both on the inside and outside surfaces of the flange 12, the split ring 1 is interconnected with the expanding means 12 and is prevented from expanding or collapsing and must remain in a true circle. Means may be fitted to lock or hold the various parts in the adjusted positions.

According to the gauge of the threads on the inner ring 6 and the angle of the expanding means, the amount of expansion can be determined by the amount of rotation of the collar 10 whereby the collar 10 can be rotated a predetermined amount to give the required expansion.

13 are holes in the flanged ring 6 and 13a holes in the collar 10 for receiving pins on a turning key for use in expanding the ring.

In the example of Figure 2, we dispense with the flanged ring 6 and screw-threaded disc 10. Holes 14 are formed in the disc or collar 11 carrying the angled flange 12, through which are passed screw bolts 15, the ends of which engage in threaded holes 16 in the inner ring 3 so that by tightening up the bolts 15 the angled flange 12 can be forced into the angle slot 5. Lock nuts 17 are employed on the bolts 15 and under the disc or collar 11 for locking same after adjustment. Also bolts 15 can be locked by the cover 18 engaging the inside edges of same when in position.

As shown in Figures 7 and 8, two angled slots 5, 5a may be employed projecting from each edge of the ring 1 towards the center and the adjusting means are constructed accordingly, i. e. in the example of Figure 7 the flange 9 of the inner ring 6 is provided with an angled flange or rim 12a for engaging in the lower slot, 5a and in the example of Figure 8 two discs 11 and 11a have angled flanges 12 12a and coacting sets of bolts 15.

In the modified construction shown in Figures 3, 4 and 6, we employ a split ring 1 having an inner ring 3 as already described with reference to Figures 1 and 2, but in this example the split ring 1 is formed with a series of internal segmental lugs or flanges 19 and the inner screw-threaded ring 6 has its flange also formed as a series of segmental lugs or flanges 20, so that by passing the segmental lugs 20 on the ring 6 through the gaps between the segmental lugs 19 on the split ring 1 and partially rotating the inner ring 6 until the two sets of segmental lugs 19 and 20 coincide the inner ring 6 and the split ring 1 are held together with the segmental lugs 20 between the portion 4 and the segmental lugs 19.

The collar 11 is preferably formed with an internal screw-thread and screws directly on the threads of flanged ring 6, and a grub-screw or pin 21 is secured into the flanged collar 11, with its head disposed and slidable in a vertical groove 22 in the split ring 1 so that the flanged collar 11 can be given only a longitudinal or rectilinear movement in relation to the split ring 1.

The split ring 1 and the flanged ring 6 are preferably locked in adjusted position by forming a screw-threaded hole 23 in one of the lugs 19 of the split ring 1 and a series of half-circular holes 24 in the lugs 20 of the flanged ring 6, a grub-screw being passed through the hole 23 for its ends to engage in one or the other of the half-circular holes 24 in the lugs 20.

25 is a brass or other nut having tommy holes 26 and is applied to protect threads on the flanged ring 6 which extend beyond the collar 11 from corrosion or injury.

Tongue pieces 27 may be provided on the edges of the split ring 1 covering the ends of the split 28 to prevent escape of steam or other fluid through the gap 11.

The ring 3 and portion 4 may be formed as a continuous ring, split only at the gap 28 or as shown in Figures 9 and 10 may have a series of radial slots or cuts 3a extending from the inside surface of the ring 3 and terminating in holes 3b in the portion 4.

In the construction shown in Figures 3 to 6, the expansion is preferably effected by removing the ring from the groove of the piston, unscrewing and removing the brass nut 25 and the grub-screw from the hole 23. The pins on a tool are then inserted in the holes 13 in the flanged ring 6 and the pins on another tool in the holes 13a and the flanged ring 6 is rotated in relation to the split ring the required distance to give the expansion required, the flanged collar 11 rotating with the split ring 1 and at the same time moving longitudinally.

According to the gauge of the threads on the inner ring 6 and angle of the flange 12 and angled slot 5, the amount of expansion can be predetermined for the degree of relative rotation between the split ring 1 and flanged ring 6. For instance, if five half-circular holes 24 are provided in the lugs and the threads are of such a gauge that 1/5 of a revolution expands the split ring 2/1000'' then all the workman has to do is ascertain the expansion required by means of "feelers" and if 2/1000'' is required then he rotates the ring until the next half-circular hole is coincident with the screw hole 23, insert the grub-screw and replace the ring in the groove of the piston.

The expanding ring 1 may also be used in conjunction with the split-rings known as "Ramsbottom" rings as in Figure 11 i. e. grooves 1a may be cut in the expanding ring 1 for the insertion of "Ramsbottom" rings 29.

Although in the examples we have described the invention as applied to a packing ring for pistons, it will be understood that the invention is equally applicable to other mechanism in which an expansible packing ring is employed.

What we do claim as our invention and desire to obtain by Letters Patent is:—

1. In an expansible packing ring construction, a split packing ring member, an inexpansible ring member, one of said members having a portion in wedge relation to and engaged on opposite sides by the other member to maintain the packing ring member truly circular and positively control the external diameter thereof, said ring members being movable axially of each other to expand the packing ring member.

2. In an expansible packing ring construction, a split packing ring member, an inexpansible ring member, one of said members having a wedge portion, the other member having a groove entered by said wedge portion, the side walls of said groove substantially conforming to and engaging opposite sides of said wedge portion to maintain the packing ring member truly circular and to positively control the external diameter thereof, said ring members being movable axially relatively to each other to expand the packing ring.

3. An expansible packing ring construction according to claim 1 having screw threaded means engaged with both members operable to effect said axial movement.

4. In an expansible packing ring construction, a split packing ring member, an inexpansible ring member, one of said members having a groove on its wall having parallel conical surfaces, an inexpansible ring member provided with a wedge portion having surfaces corresponding to and engaging said conical surfaces to maintain the packing ring member truly circular and positively control the external diameter thereof, said ring members being movable axially of each other to expand the packing ring member.

5. An expansible packing ring construction according to claim 2 having an inner ring passing through both of the ring members and provided with a part overlapping one of them, and a fastening on the inner ring overlapping the other ring member.

6. An expansible packing ring construction according to claim 2, each of said ring members having a series of spaced portions around the same, said portions being adapted for interfitting by passage through the spaces between the cooperating portions and subsequent turning.

7. An expansible packing ring construction according to claim 2 having an inner ring passing through the ring members, said inner ring having a portion overlapping one of said members, and said inner ring being screw threaded to the other member.

8. In an expansible packing ring construction, a split ring member, an inexpansible ring member, one of said members having substantially conical grooves with parallel walls, the walls of the different grooves extending in opposite angles, the other member comprising of parts having wedge portions corresponding to and entered in said grooves, and means operable to move said wedge portions relatively, whereby the packing ring is maintained circular and its external diameter is positively controlled.

ALEXANDER CROSS.
WILLIAM FEARON BROWN.